Sept. 3, 1968        K. W. SHAW        3,400,401

LUNEBERG LENS ANTENNA CONSTRUCTED FROM TWO GEODESIC DOMES

Filed Jan. 12, 1966        2 Sheets-Sheet 1

INVENTOR.
KENNETH W. SHAW
BY Harry A. Herbert Jr.
Charles H. Wagner
ATTORNEYS

United States Patent Office 3,400,401
Patented Sept. 3, 1968

3,400,401
LUNEBERG LENS ANTENNA CONSTRUCTED
FROM TWO GEODESIC DOMES
Kenneth W. Shaw, Box 3046, Eglin AFB, Fla. 32542
Filed Jan. 12, 1966, Ser. No. 520,191
7 Claims. (Cl. 343—720)

ABSTRACT OF THE DISCLOSURE

A directional radio and radar antenna employing the Luneberg principle and forming the roof of a large geodesic building structure comprising an upper arched shallow prefabricated geodesic dome and a lower concentric supporting shallow prefabricated geodesic dome therefor with the space therebetween opening outwardly around its periphery. Both spaced dome structures are formed of prefabricated substantially hexagonal metallic grid members and include spaced dielectric or plastic supporting means for the upper dome disposed between the domes, securing the domes in fixed rigid predetermined superimposed spaced relation. Plastic panels close the openings in the grid members. The structure is supported around its periphery and provides an unobstructed usable area under the geodesic antenna roof within the periphery thereof.

---

Figure 1:
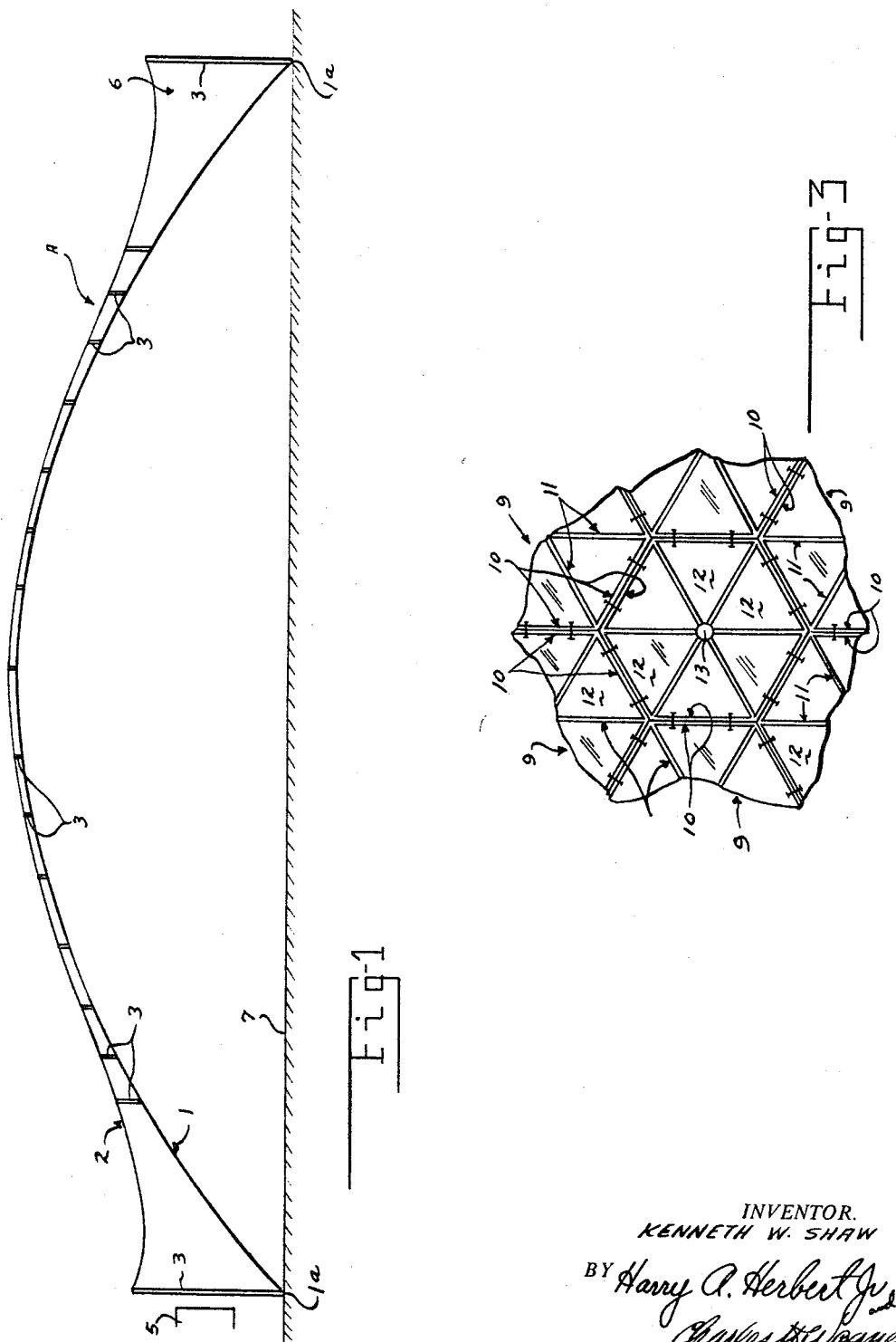

The invention described herein may be manufactured and used by or for the United States Government for governmental purposes without the payment to me of any royalty thereon.

This invention relates to Luneberg lens antenna structures and more particularly to large shallow dome shape Luneberg lens antenna building structures having for an object the provision of two vertically spaced geodesic dome structures, having the distance therebetween varied parabolically so that a high frequency electro-magnetic wave entering one side between the two geodesic dome structures is focused at one point on the opposite side.

A further object is the provision of two vertically spaced shallow geodesic domes which are connected together by plastic or dielectric structural support members to form a large rigid horizontal dome shaped Luneberg lens constructed of hexagonal metallic grid members without undesirable discontinuities, in which the shape and size is determined at the factory for mass production and for prefabricated erection in the field, rather than complete fabrication and construction by skilled construction workers in the field.

A further object of the invention is the provision of a shallow dome prefabricated Luneberg lens building structure comprising two superimposed suitably spaced shallow geodesic dome members constituting the roof of the building and including plastic dielectric insulating supporting and spacing members therebetween in which the domes comprise prefabricated hexagonal metallic grid members secured together along the adjacent edges in both of the spaced dome members to provide better directional characteristics and including solid plastic panels closing the openings in the hexagonal grid members, in which the lower prefabricated shallow geodesic dome is disposed in supporting relation for the upper spaced geodesic dome structure, on or adjacent the ground at or adjacent the periphery thereof, to provide the combined Luneberg lens and geodesic dome building enclosure which is adapted to withstand Arctic and other severe climatic conditions, providing a combined prefabricated geodesic dome building and Luneberg lens structure which can be efficiently dismantled, removed, and reassembled on different suitable supporting sites in minimum time and with minimum expense.

A further object is the provision of a directional radio and radar antenna employing the Luneberg lens principle, which forms the roof of a large geodesic building structure having an upper arched shallow prefabricated geodesic dome and a lower concentric supporting shallow prefabricated geodesic dome therefor with the space therebetween opening outwardly around its periphery, in which both spaced dome structures are formed of prefabricated substantially hexagonal metallic grid members including spaced dielectric or plastic supporting means for the upper dome disposed between the domes for securing the domes together in fixed rigid predetermined superimposed spaced relation, including plastic panels closing the openings in the grid members to form a double roof geodesic dome antenna building enclosure, supported around its periphery to provide an unsupported and unobstructed usable area under the geodesic antenna roof structure within the periphery thereof.

Other objects and advantages of the invention will become apparent from the following description and accompanying drawings in which like reference characters refer to like parts in the several figures thereof.

Drawings

FIGURE 1 is a somewhat schematic transverse vertical sectional view through a large combined shallow Luneberg lens and domed building structure incorporating the invention, in which the roof thereof comprises a lower shallow geodesic supporting dome and an upper concentric superimposed shallow geodesic dome structure supported in predetermined spaced relation above lower geodesic dome by plastic or dielectric supporting members or posts which are suitably distributed around the roof area between the spaced geodesic domes thereof.

Figure 2:
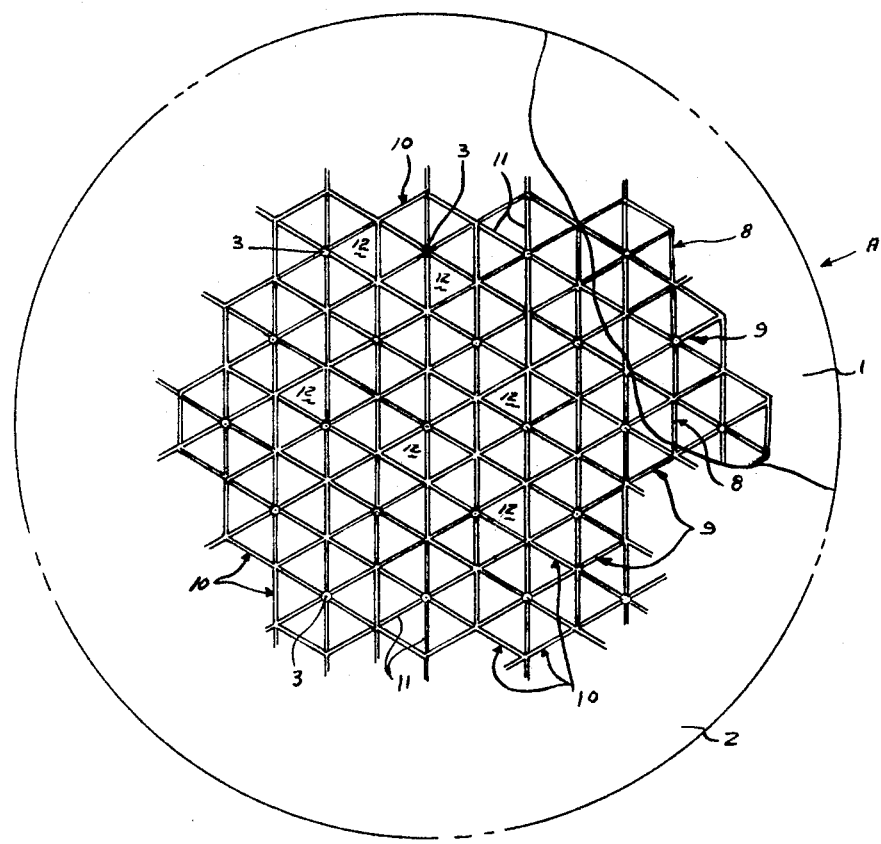

FIGURE 2 is a schematic top plan view, somewhat diagrammatically illustrating the prefabricated hexagonal metallic frame structures or grids with the outer grid portions or members broken away and omitted, and a portion of the upper geodesic dome or roof structure broken away to show a portion of the lower supporting geodesic dome and hexagonal frame grid members, the relative size of the hexagonal grid members to the diameter of the domes being somewhat exaggerated.

FIGURE 3 is an enlarged fragmentary plan view of a few of the prefabricated hexagonal frame members illustrating the solid plastic panels which are fixed in the hexagonal grid frames to form a weather-tight building structure comprising a combined geodesic dome building structure and a large Luneberg lens structure.

Geodesic building structures are well known, a few examples thereof being illustrated in or by U.S. Patents 3,063,519 to D. L. Richter, dated Nov. 13, 1962, and 3,049,201 to T. F. King et al., dated Aug. 14, 1962; also dome shape Luneberg lens structures are well known, a few examples being noted in or by U.S. Patents 2,814,040 to F. G. R. Warren, dated Nov. 19, 1957, and 3,108,278 to C. H. Walter, dated Oct. 22, 1963. Therefore the very specific structural assembly details of the hexagonal frame members of the geodesic dome structure forming the grids of the Luneberg lens building structure of the invention should not be necessary, nor should it be necessary to exemplify the Luneberg lens principles involved.

Referring to the drawings, and more particularly to FIGS. 1 and 2 the reference letter A denotes schematically a combined geodesic building structure and Luneberg lens, preferably circular, having a lower shallow geodesic dome 1 supported at its periphery 1a, while the reference numeral 2 denotes an upper or second superimposed concentric shallow geodesic dome structure which is preferably the same diameter as the upper or first or lower geodesic dome structure 1.

The upper dome structure 2 is preferably slightly parabolic in shape and fixed above the lower supporting geodesic dome 1 by suitably distributed plastic or nonmetallic structural supporting members or posts 3, the distance between the lower supporting geodesic dome 1 and the upper supported geodesic dome structure 2 being varied parabolically somewhat as shown in FIG. 1 so that high frequency electromagnetic waves entering the widened periphery at one side for instance at 4 from a high frequency electromagnetic transmitter-receiver indicated at 5 are transmitted through the Luneberg lens structure A out of the opposite side of the peripheral opening or slot indicated at 6, and, of course, the electromagnetic waves entering the other half of the peripheral opening 6, opposite the transmitter receiver 5 are focused or concentrated at 4 at one point opposite the receiving opening or semicircular portion of the slot 6 for reception by the receiver 5 in the manner well known in Luneberg lens devices and principles.

As noted above the spaced shallow domes 1 and 2, being supported around their peripheries at 1a on a suitable ground supporting surface or site 7 provide a combined Luneberg lens and building roof structure with the usable interior thereof within the periphery unobstructed or substantially unobstructed, and requiring a simple type of foundation, while the shallow double walled geodesic dome roof A constitutes the Luneberg lens structure and provides a simple strong and rigid structure which may be easily erected and strong enough to withstand Arctic and other severe climatic conditions without undesirable continuities.

The geodesic shallow dome structures 1 and 2 are preferably formed from prefabricated hexagonal grid members indicated in FIG. 2 at 8 in the supporting geodesic dome 1 and at 9 in the upper or outer supported geodesic dome 2, and comprise prefabricated steel tubing frames according to the standard practice for such geodesic domes, somewhat after the manner shown in Patent 3,063,519; each prefabricated unit comprising a metallic hexagonal grid or frame 10 having radial lighter metallic frame members 11, and suitably apertured along the adjacent or adjoining sides or perimeters of the hexagonal grids to receive suitable fastening means such as screw fasteners or bolts (not shown).

Thus each prefabricated hexagonal unit 9 (or 8), in the erection thereof, can be drawn tightly together to form the two spaced rigid upper and lower metallic Luneberg lens elements 1 and 2, constituting the roof of the building enclosure.

While the hexagonal grid frame members 8 and 9 are shown relatively large in FIG. 2 in proportion to the outer diameters of the spaced Luneberg lens units 1 and 2, the actual size of the hexagonal grids may be varied to some extent to obtain desired antenna characteristics.

While an open prefabricated geodesic grid framework may be used it is contemplated to provide a closed weather-proof combined building structure, and solid plastic panels may be provided in the openings in the grids 8 and 9, when it is desired to provide a combined Luneberg antenna and geodesic dome closed building structure including the impervious prefabricated double wall roof and Luneberg lens structure for the building.

Referring to FIG. 3, showing a relatively enlarged portion of the Luneberg lens roof structure of the building, the reference numerals 12 denote the plastic panels which are fitted into the spaces formed in the grids in the hexagonal frames 8 and 9 between the bars or radial frame members 11.

For purposes of exemplification a particular embodiment of the invention has been shown and described to the best understanding thereof.

However, it will be apparent that changes and modifications in the arrangement and construction of the parts thereof may be resorted to without departing from the true spirit and scope of the invention as defined in the following claims.

I claim:

1. A shallow dome Luneberg lens comprising a lower supporting shallow geodesic dome member, a superimposed upper spaced concentric geodesic dome member, and dielectric supporting means connected between the adjacent surfaces of the dome members distributed therebetween throughout the area thereof in spaced relation to each other, in which the upper supported shallow geodesic dome member is formed with a shallow parabolic curvature increasing radially outward in vertical direction from the lower supporting geodesic dome member, with the periphery between the dome members opening outwardly to receive electromagnetic waves therethrough, said superimposed geodesic dome members each comprise a plurality of prefabricated substantially hexagonal metallic grid members detachably secured together along their adjacent edges to form the shallow dome members, and nonmetallic sheet panel members secured in the grid members to form a combined Luneberg lens between the geodesic dome members and a shallow dome double-roof building enclosure.

2. A combined shallow dome roofed building structure and Luneberg lens, comprising, a lower supporting shallow prefabricated geodesic metallic grid dome member, an upper prefabricated shallow geodesic metallic grid dome member having a parabolic inner curvature disposed in upwardly spaced superimposed relation above the lower geodesic grid dome member, and plastic supporting post members between the dome members rigidly connecting the same together, distributed in spaced relation to each other throughout the surface area of the dome members, to provide a double geodesic dome roofed building structure having an unobstructed usable area within the peripheries thereof, below the lower supporting prefabricated shallow metallic geodesic grid dome member.

3. A prefabricated geodesic shallow dome building structure and large Luneberg lens, comprising a lower shallow geodesic dome composed of substantially hexagonal prefabricated metallic open grid frames, plastic panels closing the opening in the frames, a superimposed upwardly spaced second shallow prefabricated geodesic dome having a parabolic curvature, composed of substantially hexagonal prefabricated metallic grid members, and spaced supporting plastic nonmetallic post members connected between the adjacent surfaces of said lower and upper shallow geodesic dome members to connect the same together in rigid spaced relation to form a Luneberg lens between the domes open at its periphery to receive electromagnetic waves therethrough, with the area below the lower shallow prefabricated geodesic dome member unobstructed within its periphery.

4. A building structure as set forth in claim 3 including plastic panels closing the openings in the prefabricated hexagonal grids in the lower supporting geodesic dome.

5. A dome shape building enclosure comprising a lower prefabricated shallow geodesic dome member supported around its periphery in substantially horizontal position on a supporting site to leave the interior area enclosed within said periphery unsupported, comprising a plurality of prefabricated substantially hexagonal metallic grid frames detachably secured together along their perimeters to form said lower geodesic dome members, a second upper shallow prefabricated geodesic dome member supported in upwardly spaced superimposed relation above said lower dome member having a shallow parabolic curvature diverging outwardly away from said lower dome member comprising a plurality of prefabricated substantially hexagonal metallic grid frames secured together along their perimeters to form said upper geodesic dome members with the space between said domes opening outwardly around their peripheries to receive electromagnetic waves therebetween, said domes contoured to form a Luneberg lens structure forming the roof of said building enclosure.

6. A building structure as defined in claim 5 including spaced plastic supporting means between said lower geodesic dome member and said upper geodesic dome member for supporting the upper geodesic dome member in rigid fixed predetermined spaced relation above said lower geodesic dome member.

7. A building structure as set forth in claim 6 including plastic sheet dielectric panels fixed in said prefabricated hexagonal grid member, to close the grid openings therein.

References Cited

UNITED STATES PATENTS

| | | | |
|---|---|---|---|
| 2,814,037 | 11/1957 | Warren et al. | 343—754 |
| 2,814,040 | 11/1957 | Warren | 343—754 XR |
| 2,978,704 | 4/1961 | Cohen et al. | 343—909 XR |
| 3,343,171 | 9/1967 | Goodman | 343—754 |

HERMAN KARL SAALBACH, *Primary Examiner.*

M. NUSSBAUM, *Assistant Examiner.*